(12) United States Patent
Tseng et al.

(10) Patent No.: US 12,282,390 B1
(45) Date of Patent: Apr. 22, 2025

(54) DISTRIBUTED JOURNALING FOR WRITE OPERATIONS TO RAID SYSTEMS

(71) Applicant: GRAID Technology Inc., Santa Clara, CA (US)

(72) Inventors: Guo-Fu Tseng, Taoyuan (TW); Jin-Jhang Lee, Taipei (TW); Bo-Yi Sung, Taipei (TW); Po-Ting Liu, New Taipei (TW); Cheng-Yue Chang, New Taipei (TW)

(73) Assignee: GRAID Technology Inc., Santa Clara, CA (US)

(*) Notice: Subject to any disclaimer, the term of this patent is extended or adjusted under 35 U.S.C. 154(b) by 0 days.

(21) Appl. No.: 18/785,643

(22) Filed: Jul. 26, 2024

(51) Int. Cl.
*G06F 11/10* (2006.01)

(52) U.S. Cl.
CPC ........ *G06F 11/108* (2013.01); *G06F 11/1096* (2013.01)

(58) Field of Classification Search
CPC ........................ G06F 11/108; G06F 11/1096
See application file for complete search history.

(56) References Cited

U.S. PATENT DOCUMENTS

| | | | |
|---|---|---|---|
| 7,533,298 B2* | 5/2009 | Smith ................. | G06F 11/1441 714/22 |
| 9,229,809 B2* | 1/2016 | Moss ................... | G06F 11/1076 |
| 9,946,607 B2* | 4/2018 | Sundararaman .... | G06F 11/1088 |
| 11,429,544 B2* | 8/2022 | Steinmetz ........... | G06F 11/0751 |

OTHER PUBLICATIONS

V. Prabhakaran, "Iron File Systems." Order No. 3234574, The University of Wisconsin—Madison, Ann Arbor, 2006. (Year: 2006).*
Neil Brown, "A journal for MD/RAID5", access at https://lwn.net/Articles/665299/ on Jul. 8, 2024.

* cited by examiner

*Primary Examiner* — Joseph R Kudirka
(74) *Attorney, Agent, or Firm* — Van Pelt, Yi & James LLP

(57) ABSTRACT

Distributed journaling for write operations to RAID systems is disclosed, including: receiving a new write operation to a plurality of storage devices associated with a redundant array of independent disks (RAID) group, wherein the plurality of storage devices comprises a main data storage and a non-volatile journal storage; writing a record of the new write operation to the non-volatile journal storage; after the record of the new write operation is written to the non-volatile journal storage, writing new data associated with the new write operation to the main data storage; and after the new data associated with the new write operation is written to the main data storage, invalidating the record of the new write operation in the non-volatile journal storage, wherein upon restarting the plurality of storage devices associated with the RAID group, the non-volatile journal storage is checked and valid records of one or more write operations included in the non-volatile journal storage are written to the main data storage.

16 Claims, 10 Drawing Sheets

DISTRIBUTED JOURNALING FOR WRITE OPERATIONS TO RAID SYSTEMS

BACKGROUND OF THE INVENTION

Redundant array of independent disks (RAID) systems utilize multiple storage devices as logical units of storage to provide data redundancy or the option to recover data lost on one or more of the storage devices. Different RAID "levels" refer to different RAID schemes that provide different arrangements of data redundancy and/or fault tolerance.

Some RAID levels involve data striping, in which each stripe of data stored to the RAID system is stored across the multiple physical storage devices of the RAID system. In particular, striping involves segmenting logically sequential data and storing consecutive segments across one or more stripes across multiple physical storage devices of the RAID system. Furthermore, some RAID levels also involve using an error protection scheme referred to as "parity," in which at least one storage device in a stripe across the RAID's multiple physical storage devices stores a parity chunk. These one or more parity chunks in a stripe are computed based on the data chunks that are stored in the same stripe. In the event that a physical storage device that stores a data chunk in that stripe becomes unavailable, the data chunk that is stored on the unavailable physical device may be reconstructed using that stripe's data chunks and parity chunk(s) that are stored on the remaining, available physical storage devices of the RAID.

However, if a RAID system encounters an unexpected system crash during a write operation, then at least some of the data and parity chunks related to the write operation may not be successfully written to the physical storage devices of the RAID system prior to the crash. The incomplete writing of the data and parity chunks related to the write operation to the RAID system will result, undesirably, in inconsistent data written to one or more stripes. Inconsistent data written to one or more stripes will result in the inability to correctly reconstruct data chunks using the parity chunks stored in the affected stripes in the event of outages at individual physical storage devices. The phenomenon of having inconsistent data written to one or more stripes is referred to as a "write hole." It would be desirable to efficiently and reliably address the problem of a write hole in a RAID system.

BRIEF DESCRIPTION OF THE DRAWINGS

Various embodiments of the invention are disclosed in the following detailed description and the accompanying drawings.

DETAILED DESCRIPTION

Figure 1:
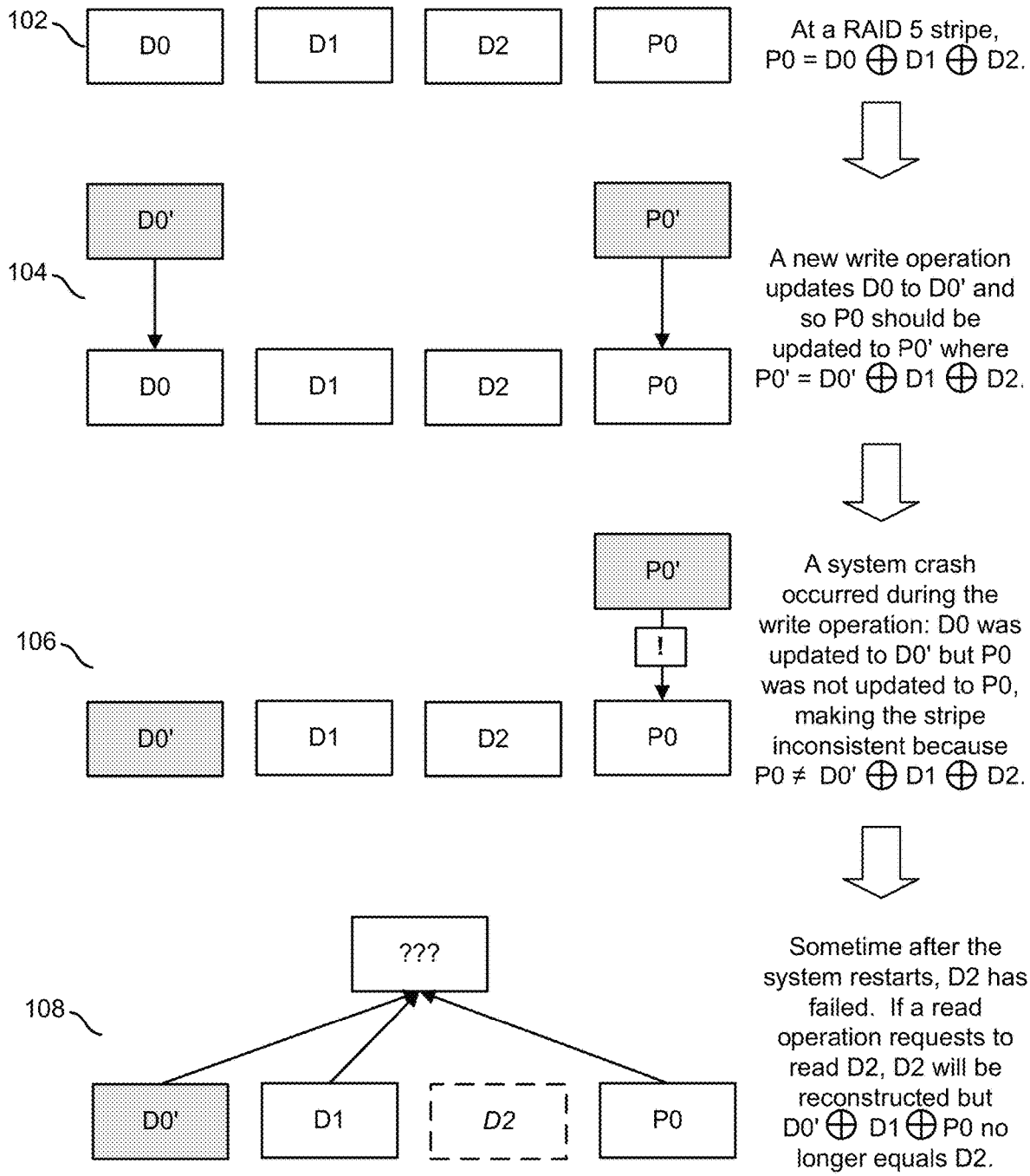
FIG. 1 describes an example of the "write hole" problem with respect to a RAID 5 system comprising four drives.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In RAID levels 4, 5, and 6, data is stored as chunks in stripes and at least one parity chunk is also stored in each stripe. In particular, RAID 4 requires at least three physical storage devices (or sometimes referred to as "drives") and one is dedicated to storing the parity chunks that correspond to each stripe. One disadvantage of RAID 4 is that all writes impact the dedicated parity drive, which causes a bottleneck for all write operations. RAID 5 requires at least three drives and stores parity chunks in a distributed manner among the drives. Specifically, the drive on which a parity chunk is stored for a chunk may rotate across the drives of the RAID 5 system. Because RAID 5 includes one parity chunk per stripe, the system can still operate when one of the drives becomes unavailable (e.g., fails). For example, if one drive fails in a RAID 5 system, then the distributed parity can be used to service subsequent read operations by reconstructing missing data chunks that were stored on the failed drive. RAID 6 requires at least four drives and also stores parity chunks in a distributed manner among the drives. However, unlike RAID 5, RAID 6 stores two parity chunks per stripe. Because RAID 6 includes two parity chunks per stripe, the system can still operate when up to two of the drives become unavailable (e.g., fail). For example, if two drives fail in a RAID 6 system, then the distributed parity can be used to service subsequent read operations by reconstructing missing data chunks that were stored on the failed drives.

Parity chunk(s) are computed based on the data chunks that are stored in the same stripe and can be used to reconstruct any of the data chunks in the event that the drives on which data chunks are written become unavailable (up to the fault tolerance are provided by the respective RAID level). While the presence of parity chunk(s) enable data reconstruction, the parity chunk(s) must be "consistent" with the data chunks stored in the same stripe in order to achieve correct reconstruction. "Consistency" in a stripe is met when the parity chunk(s) in the stripe are actually computed (e.g., via the Reed-Solomon code) from the data chunks from the same stripe. "Inconsistency" in a stripe occurs when the parity chunk(s) in the stripe are not actually computed (e.g., via the Reed-Solomon code) from the data chunks from the same stripe. While a stripe is known to be temporarily "inconsistent" at moments during a write operation because the individual drives in a RAID system are updated independently (as opposed to atomically), a stripe's inconsistency as a result of an incomplete write operation is harder to detect after a restart of the RAID system following a failure (e.g., a crash or power loss) of the whole RAID system. The risk of this possible stripe inconsistency upon a RAID system restart is that a data chunk that is reconstructed using a parity chunk of an inconsistent stripe will result in a corrupted/incorrect data chunk. This problem is referred to as a "write hole."

FIG. 1 describes an example of the "write hole" problem with respect to a RAID 5 system comprising four drives. In the example of FIG. 1, 102 refers to the data and parity chunks stored in a stripe across the four drives of the RAID 5 system, prior to a new write operation. Specifically, in the state as shown with 102, the stripe currently stores data chunk D0 at a first drive, data chunk D1 at a second drive, data chunk D2 at a third drive, and parity chunk P0 at the fourth drive. Furthermore, in the state as shown with 102, parity chunk P0 was computed as a function of D0⊕D1⊕D2. At 104, a new write operation is received, which requires D0 to be updated to D0'. As a result of updating D0 to D0', the updated parity chunk that is computed as a result of D0'⊕D1⊕D2 should be P0'. At 106, in the execution of the new write operation, in which D0 should be updated to D0' and P0 should be updated to P0', the RAID system crashes after D0 is updated to D0' but before P0 is updated to P0'. This occurrence creates a write hole, as shown in 108, because the stripe is no longer consistent since the P0 in the stripe does not equal D0'⊕D1⊕D2. After the RAID system restarts following the unclean shutdown, the drive that stored D2 in the stripe had failed and then a read operation that requests D2 is received. Absent a solution to remedy this write hole, the stripe still remains inconsistent and so if D2 is attempted to be reconstructed by reading from the available drives D0', D1, and P0, the computation of D0'⊕D1⊕P0 will not equal to D2 and therefore, corrupt data will be undesirably returned to the requestor.

Conventionally, to address the problem of the "write hole" on a RAID system, the data related to a write operation is first written to a separate, dedicated journal device before being written to the RAID system. As such, in the event of unclean shutdown of the RAID system, after the system restarts, the journaled write operations stored on the dedicated journal device can be performed again on the RAID system to ensure that the data chunks and parity chunks are completely written to the relevant stripes.

Figure 2:
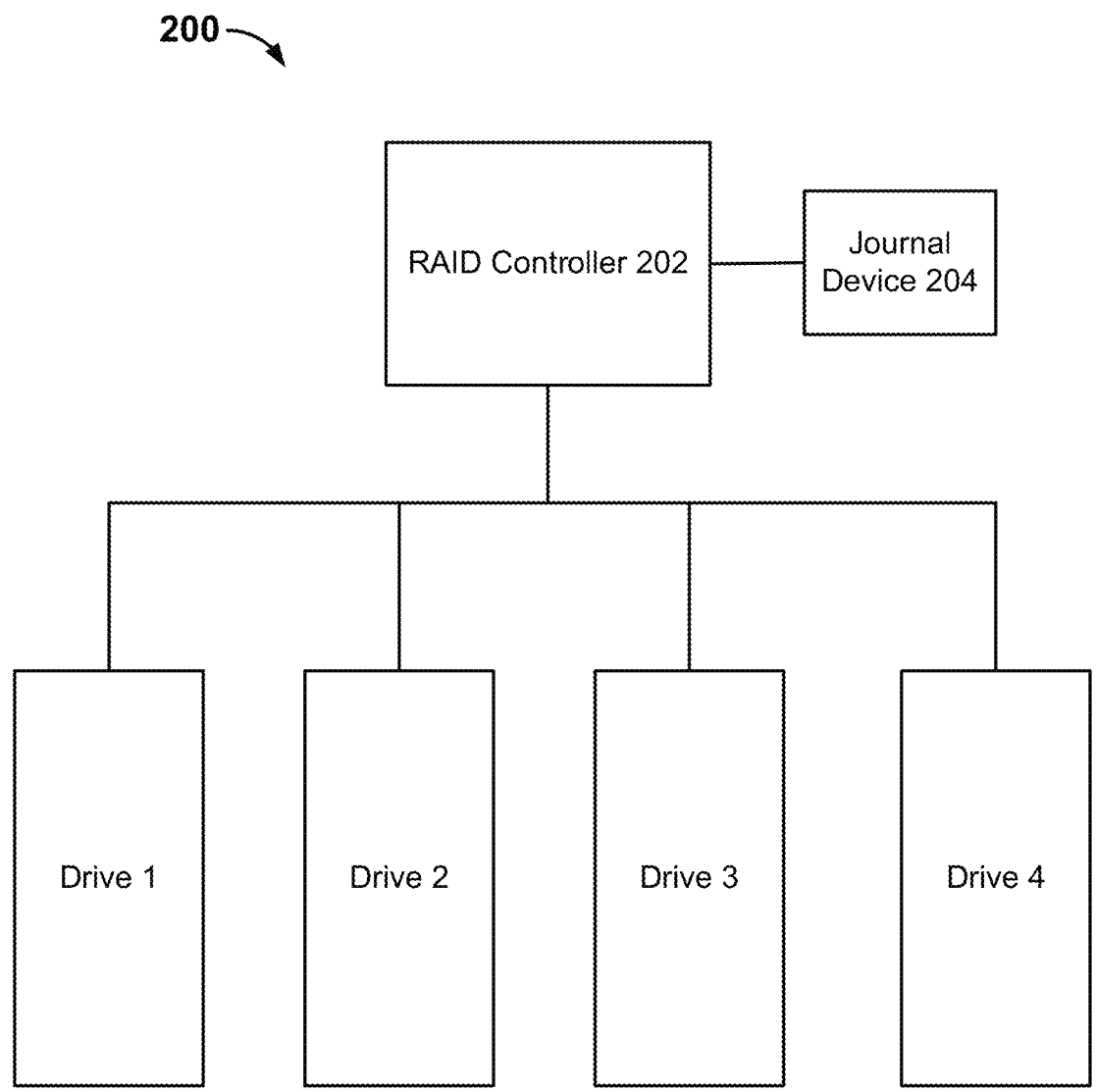
FIG. 2 is an example of a conventional journal device configured to store data on write operations to a RAID system.

FIG. 2 is an example of a conventional journal device configured to store data on write operations to a RAID system. In the example of FIG. 2, system 200 shows an example RAID 5 system comprising four drives (Drives 1, 2, 3, and 4) that is controlled by RAID controller 202. In the example of FIG. 2, as write operations are received at RAID controller 202, prior to storing the data and parity chunks of each write operation to the participating ones of Drives 1, 2, 3, and 4, RAID controller 202 first records data related to the write operation to journal device 204. Journal device 204 comprises a dedicated journal device, which is separate from the four RAID drives and that is configured to store journal entries related to write operations before they are executed on the RAID drives. For example, journal device 204 can be implemented as a single physical device or as a set of mirrored physical devices. In the event that the RAID system abruptly shuts down while a write operation is still being executed, after the system restarts, data pertaining to this incomplete write operation can be retrieved from journal device 204 and then written (again) on the participating ones of Drives 1, 2, 3, and 4 to ensure that the affected stripes are consistent.

Nevertheless, using a dedicated journal device such as shown in FIG. 2 has many downsides. One downside is that the dedicated journal device is a single point of failure. Another downside is that the dedicated journal device has a limited write bandwidth, which could constrain the RAID system's overall write throughput. Yet another downside is that if the dedicated journal device were implemented using a solid-state drive (SSD) (which has a lower write endurance as compared to that of a hard disk drive), because each write operation to the RAID system would entail one or more corresponding writes to the dedicated journal device, the limited write cycles of the SSD-based dedicated journal device may be quickly used up. It would be desirable to journal write operations in a RAID system in an efficient and effective manner that avoids the drawbacks of the dedicated journal device.

Embodiments of distributed journaling for write operations to a RAID system are described herein. A new write operation to a plurality of storage devices associated with a RAID group is received. The plurality of storage devices comprises a main data storage and a non-volatile journal storage. In some embodiments, each storage device (drive) in the RAID group comprises an SSD. In some embodiments, each storage device in the RAID group includes a first corresponding portion that is a main data storage space for storing data and parity chunks associated with write operations to the RAID system, and a second corresponding portion (the "non-volatile journal storage") that is reserved for journal records related to write operations. A journal record of the new write operation is written to the non-volatile journal storage. In some embodiments, the record of the new write operation written to the reserved journal portion of one or more storage devices of the RAID group comprises two parts. The first part of the record is a journal metadata portion that describes the participating storage devices of the new write operation. The second part of the record is a journal data portion that comprises the data and parity chunks of the new write operation. After the record of the new write operation is added to the non-volatile journal storage, the new data (comprising the data and parity chunks) of the new write operation is written to the main data storage. In some embodiments, the new data of the new write operation is written to the respective main data storage spaces of participating storage devices of the RAID group. After the new data of the new write operation is written to the main data storage, the record of the new write operation is invalidated in the non-volatile journal storage. As a result of invalidating the record associated with the new write operation, when the RAID group is restarted (e.g., after an unclean shutdown), the non-volatile journal storage is checked and valid records of one or more write operations included in the non-volatile journal storage are used to perform the write operation(s) on the main data storage. Put another way, because the record of a write operation is invalidated only after the write operation is completed and the affected stripe(s) are consistent, the presence of a still-valid record indicates that its corresponding write operation was not completed prior to a (e.g., unclean) shutdown of the RAID system and therefore, the write operation(s) associated with valid records should be performed again at the RAID storage devices.

Figure 3:
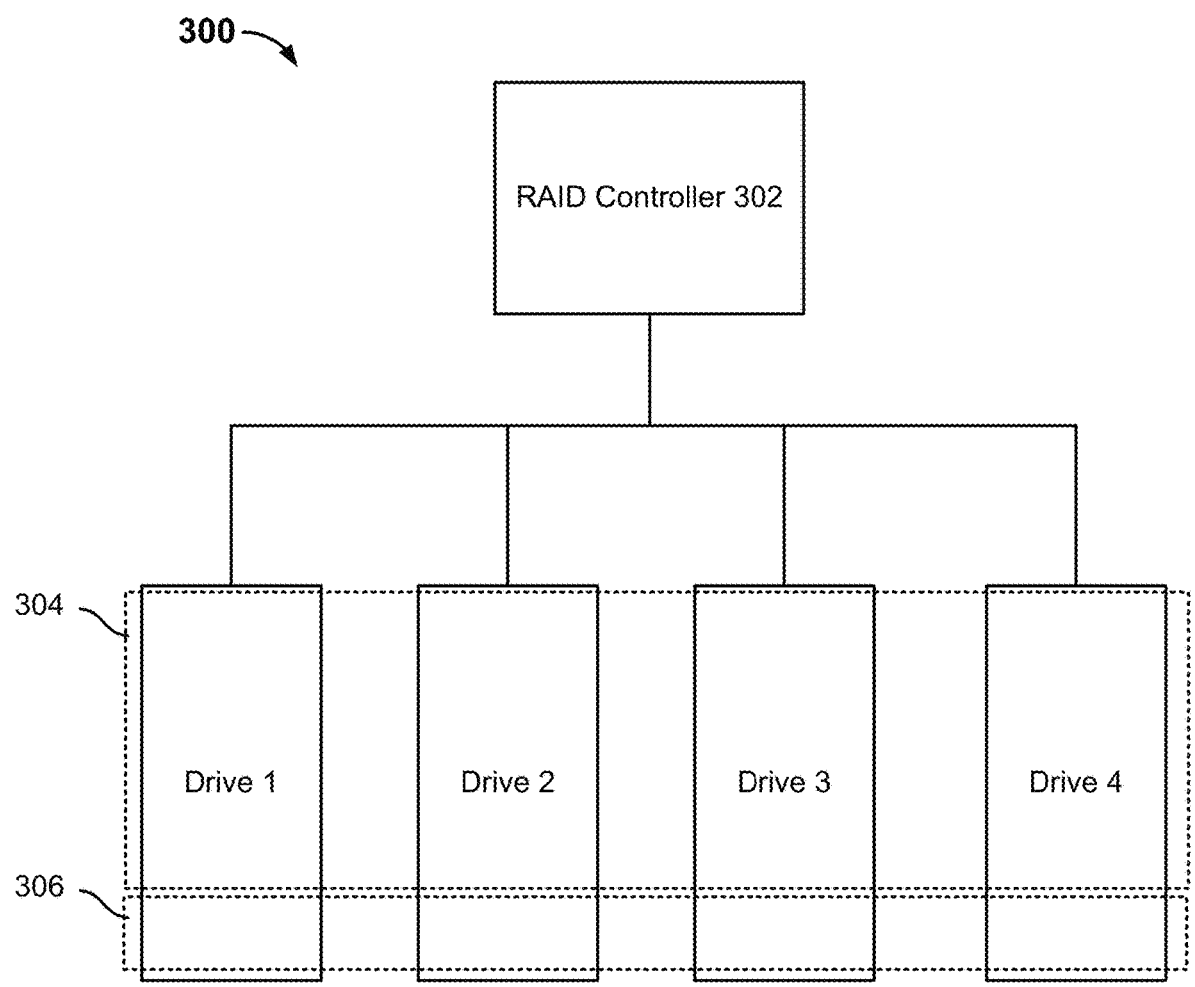
FIG. 3 is a diagram showing an embodiment of a RAID system with distributed journaling for write operations.

FIG. 3 is a diagram showing an embodiment of a RAID system with distributed journaling for write operations. In the example of FIG. 3, system 300 is implementing RAID 5 but the techniques described herein can also be applied to RAID 4, RAID 6, or any non-standard RAID mode that stores three or more parity chunks in a stripe. System 300 comprises RAID controller 302 and the RAID group comprising the four storage devices of Drives 1, 2, 3, and 4.

Data related to new write operations received at RAID controller 302 (e.g., from a host or an application) will be stored at main data storage 304 of Drives 1, 2, 3, and 4. As shown in FIG. 3, main data storage 304 comprises a respective portion of each of Drives 1, 2, 3, and 4. The data related to new write operations comprises not only the data chunks that are included in the write operations and that are requested to be stored by the operations but also the parity chunks that are computed based on the data chunks of the same stripes in which the parity is to be stored. Journal data pertaining to the new write operations is written to reserved non-volatile journal storage 306 of Drives 1, 2, 3, and 4. Reserved non-volatile journal storage 306 also comprises a respective portion of each of Drives 1, 2, 3, and 4. In some embodiments, the region at each of Drives 1, 2, 3, and 4 at which to reserve for non-volatile journal storage 306 are configured prior to write operations being received by RAID controller 302.

In various embodiments, in response to the receipt of a new write operation, RAID controller 302 determines the data chunks from the new data that is requested to be written as well as the locations on the storage devices (among Drives 1, 2, 3, and 4) that are to participate in the write operation. Furthermore, RAID controller 302 computes the (updated) parity chunk(s) to be stored in each stripe that is affected by the new write operation. Before RAID controller 302 initiates writing such data and parity chunks of the new write operation to main data storage 304 of Drives 1, 2, 3, and 4, RAID controller 302 first stores a journal record related to the new write operation to reserved non-volatile journal storage 306 of Drives 1, 2, 3, and 4. As will be described in further detail below, the journal record comprises a journal metadata portion and a journal data portion of the new write operation. In various embodiments, the journal data portion of the new write operation comprises the data and parity chunks of the new write operation are stored on the drives of Drives 1, 2, 3, and 4 for which the data and parity chunks will also be stored on the main data storage thereof. In various embodiments, the journal metadata portion of the new write operation describes at least where within main data storage 304 on the participating ones of Drives 1, 2, 3, and 4 the data and parity chunks of the same journal record are to be stored. In various embodiments, the journal metadata portion of the new write operation is stored on at least two of Drives 1, 2, 3, and 4. Only after the journal record of the new write operation has been completely/successfully written to non-volatile journal storage 306 does RAID controller 302 write the data and parity chunks of the new write operation to the affected stripes of Drives 1, 2, 3, and 4 in main data storage 304. Then, only after data and parity chunks of the new write operation have been completely/successfully written to the affected stripes of Drives 1, 2, 3, and 4 in main data storage 304 does RAID controller 302 invalidate the corresponding journal record in non-volatile journal storage 306.

In the way described above, non-volatile journal storage 306 stores valid journal records of new write operations that are still "inflight" or have not yet been completely written to main data storage 304 of Drives 1, 2, 3, and 4. In the event of a system crash or power failure, any inflight write operations to Drives 1, 2, 3, and 4 will not be able to be completed and as such, their respective journal records in non-volatile journal storage 306 will remain valid. When the RAID system restarts after such an unclean shutdown, RAID controller 302 can scan non-volatile journal storage 306 across Drives 1, 2, 3, and 4 for the presence of any valid journal records and for each such valid journal record, RAID controller 302 can use the journaled data/parity chunks and the journaled metadata to perform the write operations in their entirety, to ensure that the stripes affected by the write operations will be consistent. By journaling each write operation in accordance with various embodiments described herein, the set of actions (e.g., updates of data chunk(s) and parity chunk(s) to one or more stripes in a RAID group) associated with the write operation is treated as a single transaction that must be executed "atomically" (all actions of the transaction are required to be completed or else the actions thereof will be attempted again).

In contrast to conventional system 200 of FIG. 2, system 300 does not include a dedicated journal device. As described with system 300 of FIG. 3 and as will be described in further detail below, the journal record corresponding to a new write operation is distributed across multiple storage devices of a RAID system and will therefore lower the write burden on any individual storage device of the RAID group. By distributing the journaling-related writes across multiple storage devices, such writes can be completed faster than if they were all directed to a single storage device. Furthermore, by distributing the journaling-related writes across multiple storage devices, all the SSD-based storage devices in the RAID group will have comparable lifespans. Moreover, in some embodiments, by redundantly storing the journal metadata of a new write operation, even if one storage device of the RAID group becomes unavailable, a remaining, available copy of the journal metadata can be detected as being related to a valid journal record of an incomplete write operation and therefore, the journal record be replayed to complete the write operation upon a system restart.

Figure 4:
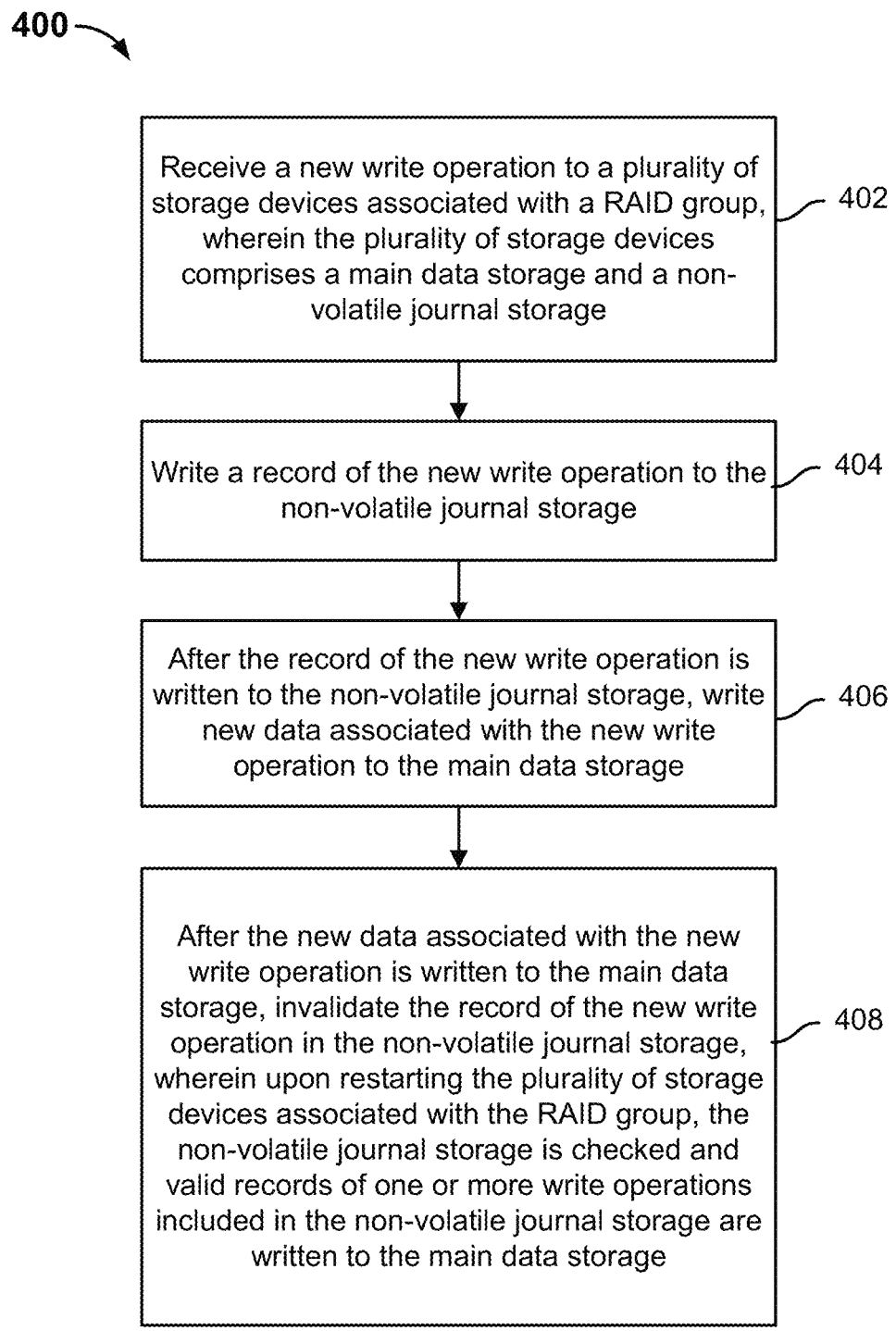
FIG. 4 is a flow diagram showing an embodiment of a process for performing distributed journaling for write operations in a RAID system.

FIG. 4 is a flow diagram showing an embodiment of a process for performing distributed journaling for write operations in a RAID system. In some embodiments, process 400 may be implemented at a system such as system 300 of FIG. 3. Specifically, process 400 may be implemented at RAID controller 302 of FIG. 3.

At 402, a new write operation to a plurality of storage devices associated with a RAID group is received, wherein the plurality of storage devices comprises a main data storage and a non-volatile journal storage. In various embodiments, the level/mode of RAID that is implemented across the group of storage devices of the RAID system comprises striping and also uses parity such as RAID 4, 5, or 6 or a non-standard RAID that uses three or more parity chunks in a stripe. The number of storage devices in the RAID group is at least the minimum number of storage devices that needs to be used for the implemented RAID level/mode (e.g., RAID 4, 5, or 6). In various embodiments, each storage device comprises an SSD. In some embodiments, the size of the data (which is also referred to as "strip size" or "chunk size") that is to be stored on each storage device in a stripe can be configurable. For example, the strip size can be configured to be 4k, 8k, 16k, 32k, 64k, or 128k.

In various embodiments, the new write operation comprises at least the new user data (e.g., in the form of logical block addresses (LBAs)) to write to the RAID group and a specified location to start the write.

In various embodiments, prior to bounding a plurality of storage devices as a RAID group, a smaller portion of each storage device's non-volatile storage medium (e.g., NAND flash) is reserved to collectively serve as the non-volatile journal storage (by storing distributed journal records) while another, larger portion of each storage device's non-volatile storage medium is configured to collectively serve as the main data storage (by storing the user data chunks that are requested to be written to the RAID group as well as parity chunks that are computed based on the data chunks).

In some embodiments, the new write operation comprises a nonvolatile memory express (NVMe) write command and includes at least the following parameters:
1) Which location(s) (LBA: Logical Block Address) on the SSD(s) new data is to be written.
2) The location/memory address at which this "new data" is currently stored/staged. This new data is then fetched from this identified location (e.g., at a host memory) to be journaled/written to the main data storage of the RAID group.
3) The length of the new data.

For example, the "new data" associated with the new write operation is then fetched from this identified location based on the provided length so that it can be journaled/written to the main data storage of the RAID group.

In response to receipt of the new write operation, the new user data included in the write operation is segmented into new data chunks in accordance with the configured RAID level/mode (e.g., RAID 4, 5, or 6) and/or strip size. Then, the new data chunk(s) from the new write operation to be updated to a stripe as well as any existing data chunk(s) of the stripe that are not to be updated are read from the storage device(s) and are used to compute one or more parity chunk(s) to be updated in that stripe in accordance to the configured RAID level/mode.

At 404, a record of the new write operation is written to the non-volatile journal storage. In various embodiments, the non-volatile journal storage comprises a first region/space for metadata of a journal record related to a write operation and a second region/space for new data/parity chunks of the journal record related to the write operation. In some embodiments, the new data/parity chunks of the journal record related to a write operation comprise the actual new data chunks of the write operation and related parity chunks that will be stored on one or more stripes of the main data storage portions of the storage devices of the RAID group. In some embodiments, the metadata of the journal record related to the write operation describes where (e.g., which stripes on which storage device) to write the actual new data chunks of the write operation and related parity chunks in the storage devices in the RAID group. For example, the metadata of the journal record related to the write operation includes identifiers of the storage devices that are participating in the write operation, where the actual user write locations are a metadata checksum and a checksum of data chunks. As such, the metadata of the journal record related to the write operation is written to the region/space of the non-volatile journal storage that is designated for journal metadata, on two or more storage devices. Furthermore, the new data/parity chunks of the journal record related to the write operation are written to the other region/space of the non-volatile journal storage that is designated for journal data, on two or more storage devices. In some embodiments and as will be shown in the example described in FIG. 8 below, the data and parity chunks related to the new write operation can be stored in the designated journal data space of the same RAID drives on which the data and/or parity chunks are to be (later) stored on the main data storage thereof.

At 406, after the record of the new write operation is written to the non-volatile journal storage, new data associated with the new write operation is written to the main data storage. After the metadata and new data/parity chunks of the journal record corresponding to the new write operation have been successfully written to the non-volatile journal storage portion of the storage devices of the RAID system, the new data and parity chunks related to the write operation are written to their respective stripes in the main data storage of the participating storage devices. After the journal record is successfully written to the non-volatile journal storage and before the corresponding new write operation is completed on the main data storage, the record will be valid (e.g., the one or more checksums of the record will be valid against the record's data or metadata).

At 408, after the new data associated with the new write operation is written to the main data storage, the record of the new write operation is invalidated in the non-volatile journal storage, wherein upon restarting the plurality of storage devices associated with the RAID group, the non-volatile journal storage is checked and one or more write operations associated with valid records in the non-volatile journal storage are performed on the main data storage. After the new data and parity chunks related to the write operation have been successfully written to their respective stripes at the participating storage devices, the journal record corresponding to the completed new write operation will be invalidated. In one example, invalidating the journal record may include zeroing out or erasing at least one field in all copies of the journal metadata that are included in the record related to the new write operation. Since the minimal write operation unit of SSDs is 4096 bytes (Single LBA) and, in some embodiments, the metadata record size is less than 4096 bytes, zeros can be written to the location of the journal metadata, for example. In a second example, invalidating the journal record may include updating one or more checksums of the journal record so that they will not be valid against the record's data or metadata.

The reason for invalidating the journal record corresponding to the completed new write operation is that an invalidated journal record denotes that a corresponding write operation has completed without the interruption (e.g., due to a RAID system crash). Upon a system restart following such a crash, the non-volatile journal storage portions of the storage devices in the RAID group will be scanned for valid journal records and where each such valid journal record denotes a write operation that was not successfully completed on the main data storage prior to an unclean system shutdown. As will be described in further detail below, each such detected journal record will be "replayed" at the main data storage, whereby the corresponding data and parity chunks stored in the journal data region will be rewritten to the main data storage of storage device(s) at locations described by the journal metadata pertaining to the same journal record.

Figure 5:
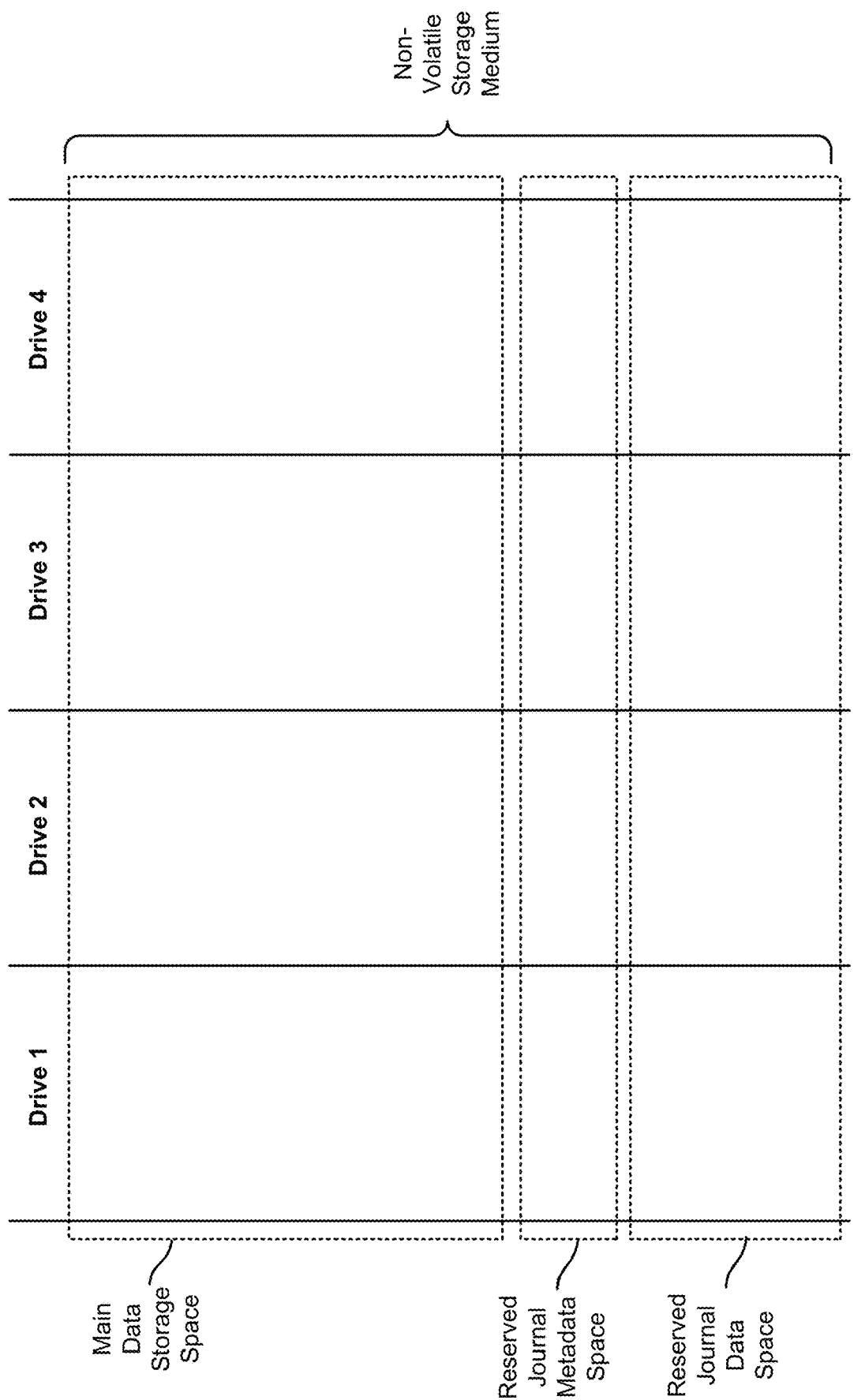
FIG. 5 is a diagram showing an example layout of a RAID 5 system of storage devices configured for distributed journaling for write operations in accordance with some embodiments.

FIG. 5 is a diagram showing an example layout of a RAID 5 system of storage devices configured for distributed journaling for write operations in accordance with some embodiments. As shown in FIG. 5, a respective portion of each storage device (Drives 1, 2, 3, and 4) is used to collectively implement the main data storage (e.g., main data storage 304 of FIG. 3) of the RAID group. As described above, the main data storage stores the data and parity chunks in stripes in accordance with the RAID level/mode (e.g., RAID 4, 5, or 6) that is implemented. Specifically, the majority of the non-volatile storage medium (e.g., the NAND flash) of each SSD-based storage device is used to collectively implement the main data storage of the RAID group. In some embodiments, a respective second portion of each storage device (Drives 1, 2, 3, and 4) is used to collectively implement the reserved non-volatile journal storage (e.g., non-volatile journal storage 306 of FIG. 3) of the RAID group. Since the journaling is to protect data associated with only "inflight" write operations (e.g., the data that is currently being written but not completely written to the RAID group), the size of the reserved non-volatile journal storage is configured based on the amount of the inflight data. In some embodiments, about 500 MB in the non-volatile storage medium (e.g., NAND) on each SSD-based storage device of the RAID group is reserved for the journaling. However, the actual size of the reserved non-volatile journal storage that is implemented on each SSD-based storage device of the RAID group can be changed based on system design requirements.

Also as shown in FIG. 5, the non-volatile journal storage comprises two regions: a reserved journal metadata space and a reserved journal data space. As described above, the reserved journal data space stores the new data and parity chunks of write operations. Specifically, a less than the majority of the non-volatile storage medium (e.g., the NAND flash) of each SSD-based storage device is used to collectively implement the reserved journal data space of the RAID group. As will be described in further detail below, the new data and parity chunks of a write operation are written to the reserved journal data spaces of at least two storage devices of the RAID group. Also as described above, the reserved journal metadata space stores metadata that describes where the new data and parity chunks of the write operation are to be written to the main data storage. Specifically, a less than the majority of the non-volatile storage medium (e.g., the NAND flash) of each SSD-based storage device is used to collectively implement the reserved journal metadata space of the RAID group. As will be described in further detail below, the journal metadata of a write operation is written to the reserved journal metadata spaces of at least two storage devices of the RAID group. In some embodiments, the main data storage and the reserved journal data space both use data striping. In some embodiments, a journal metadata uses only a single LBA (4096 bytes) for each write operation, and it is replicated on two storage devices in a RAID 5 configuration or replicated on three storage devices in a RAID 6 configuration on the RAID volume.

While not shown in FIG. 5, in some other embodiments, a "persistent memory region" (PMR) exists in each storage device of the RAID group. The PMR may include a volatile memory (e.g., dynamic random-access memory (DRAM)) with a low write latency. In these other embodiments, instead of reserving a portion of the SSD's non-volatile storage medium (e.g., NAND flash) to store the reserved journal metadata, the PMR is instead used to implement the reserved journal metadata space. Writing journal metadata to a volatile memory will advantageously free up space in the non-volatile storage medium (e.g., for the main data storage), reduce write latency to the non-volatile (e.g., NAND flash) regions of the storage devices, and also reduce the number of writes to the non-volatile (e.g., NAND flash) regions of the storage devices. While the PMR includes a volatile memory, the journal metadata on the PMR may be selectively persisted thanks to a small battery that is included in the SSD, which will enable the journal metadata that is written to the DRAM to be copied over (e.g., by the RAID controller) to a non-volatile region of the storage device in the event of an unclean shutdown (e.g., a crash or a power failure) of the RAID system.

Figure 6:
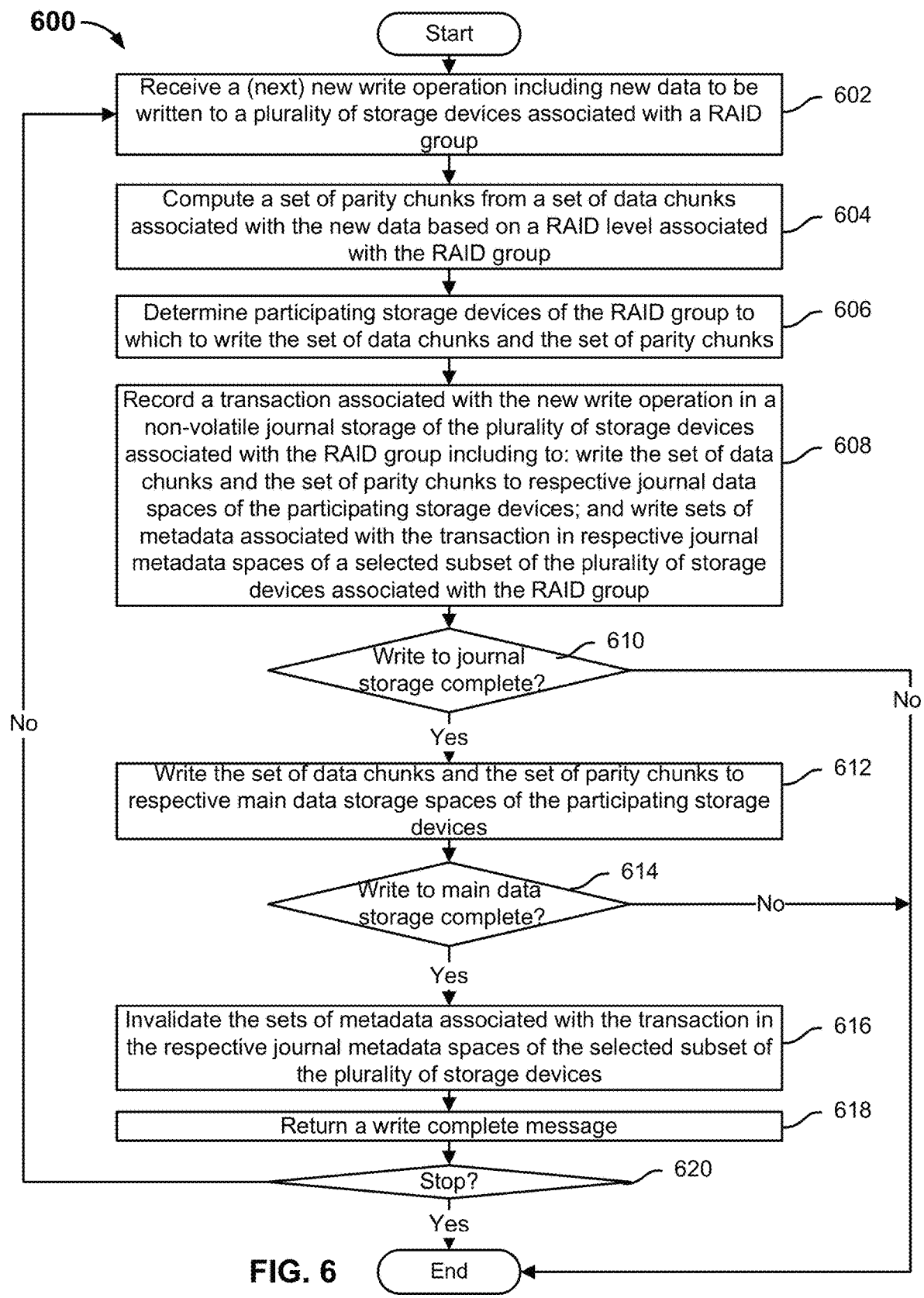
FIG. 6 is a flow diagram showing an example process for performing distributed journaling for write operations at a RAID system in accordance with some embodiments.

FIG. 6 is a flow diagram showing an example process for performing distributed journaling for write operations at a RAID system in accordance with some embodiments. In some embodiments, process 600 may be implemented at a system such as system 300 of FIG. 3. Specifically, process 600 may be implemented at RAID controller 302 of FIG. 3. In some embodiments, process 400 of FIG. 4 may be implemented, at least in part, using process 600.

At 602, a new write operation including new data to be written to a plurality of storage devices associated with a RAID group is received. The new write operation (e.g., received from a host or application) includes new data that is to be written to the storage devices of the RAID group.

At 604, a set of parity chunks is computed from a set of data chunks associated with the new data based on a RAID level associated with the RAID group. The new data is then segmented into data chunks based on, at least, the configured strip size of the RAID group. The one or more stripes of the main data storage spaces of the storage devices to which the data chunks are to be written are determined based at least in part on the RAID level/mode (e.g., RAIDs 4, 5, or 6) that has been configured for the RAID group. For example, one or more of the new data chunks are to be written to the main data storage spaces of the participating storage devices for each stripe of the RAID group that is affected by the new write operation. It is possible that fewer than all of the existing data chunks in an affected stripe is to be overwritten with new data chunks associated with the new write operation. Then, one or more parity chunks are computed based on the new data chunk(s) that will be stored in the same affected stripe of the main data storage space of the participating storage devices and/or existing data chunks of that same stripe that are not be overwritten. Each parity chunk in each affected stripe is computed using an erasure code such as Reed-Solomon, for example. The number of parity chunks that is computed for each stripe is determined based on the configured RAID level. For example, for both RAID 4 and RAID 5, only one parity chunk is computed per stripe. For RAID 6, two parity chunks are computed per stripe.

At 606, participating storage devices of the RAID group to which to write the set of data chunks and the set of parity chunks are determined. As described above, on which stripe in the main data storage spaces of which storage device each new data chunk and each computed parity chunk are to be stored is determined based at least in part on the configured RAID level/mode.

At 608, a transaction associated with the new write operation is recorded in a non-volatile journal storage of the plurality of storage devices associated with the RAID group including by: writing the set of data chunks and the set of parity chunks to respective journal data spaces of the participating storage devices, and writing sets of metadata associated with the transaction in respective journal metadata spaces of a selected subset of the plurality of storage devices associated with the RAID group. A journal record that encapsulates the transaction of actions to be made to the main data storage of the RAID storage devices associated with the new write operation is first written to the non-volatile journal storage of the RAID storage devices. In particular, in some embodiments, writing the journal record associated with the transaction to the non-volatile journal storage of the RAID storage devices comprises two parts. The first part is to write journal metadata, which describes at least the stripes/locations within the main data storage spaces to store each new data chunk and parity chunk associated with the new write operation, to the reserved journal metadata portion of two or more storage devices of the RAID group. The second part is to write journal data, which comprises the actual new data chunk(s) and parity chunk(s) associated with the new write operation, to the reserved journal data portion of two or more storage devices of the RAID group. Because each of the journal metadata and the journal data related to the transaction associated with the new write operation are stored across respective two or more storage devices of the RAID group, this form of journaling on the RAID drives themselves is "distributed."

In some embodiments, the journal metadata related to the transaction of the new write operation comprises the identifiers of the storage devices that are participating in the write operation, where the actual user write locations are, a metadata checksum, and a checksum of data chunks.

Figure 7:
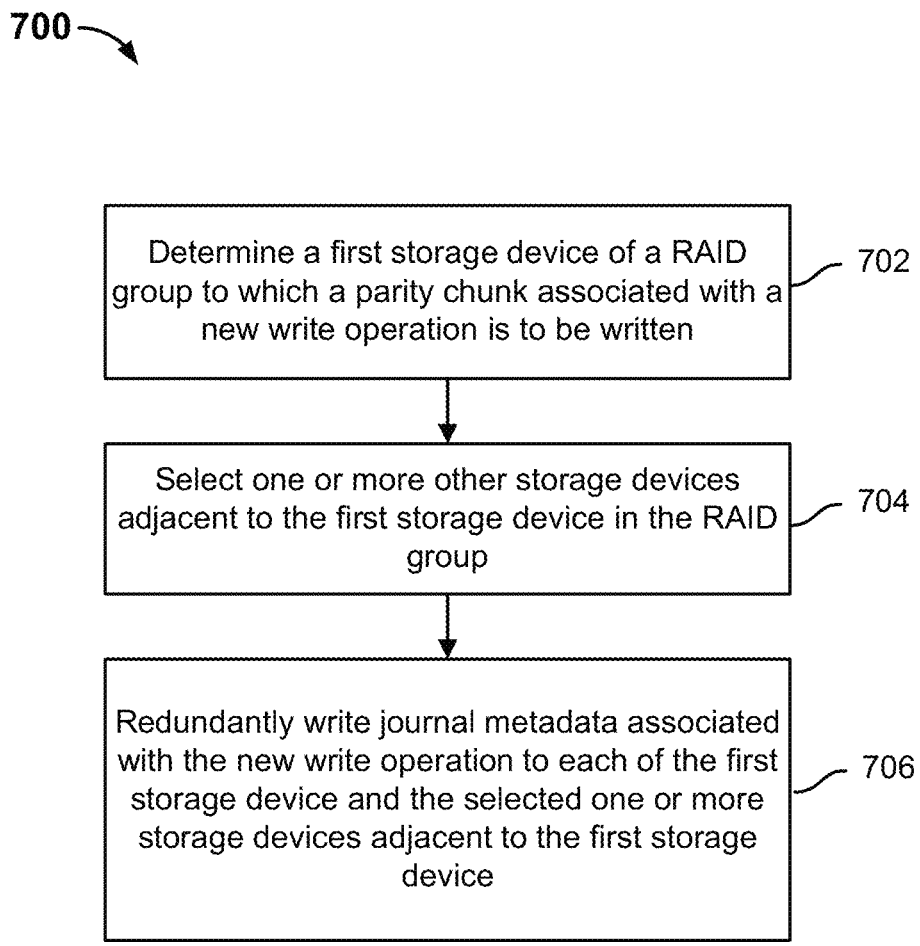
FIG. 7 is a flow diagram showing an example process for selecting storage devices in a RAID group on which to store journal metadata corresponding to a new write operation in accordance with some embodiments.

In some embodiments, the same journal metadata related to the transaction of the new write operation is redundantly stored on the respective reserved journal metadata portions of at least two storage devices of the RAID group. This journal metadata is stored on multiple storage devices so that even if one of such storage devices of the RAID group fails following a system restart, the other, redundant journal metadata can still be used to replay the new write operation. Which two or more storage devices of the RAID group that are to be selected for redundantly storing the journal metadata related to the transaction of the new write operation may be selected using any technique. One example factor for this selection is to balance the number of writes that are made across the SSD-based storage devices of the RAID group given their limited write cycles. FIG. 7, below, describes an example technique for selecting the two or more storage devices of the RAID group that are to be selected for redundantly storing the journal metadata related to the transaction of the new write operation.

Returning to FIG. 6, in some embodiments, the journal data related to the transaction of the new write operation is stored to the reserved journal data spaces of the storage devices that are participating in the new write operation. In one example, the new data chunks and the parity chunks related to the new write operation are to be stored in the respective reserved journal data spaces of the same storage devices on which the new data chunks and the parity chunks are to be eventually stored in the respective main data storage spaces.

At 610, whether writes associated with the transaction to the non-volatile journal storage of the selected subset of the plurality of storage devices have completed are determined. In the event that the writes associated with the transaction to the non-volatile journal storage have completed, control is transferred to 612. Otherwise, in the event that the writes associated with the transaction to the non-volatile journal storage have not completed (e.g., due to an interrupted caused by a system crash/power failure), process 600 ends. Only after both the journal metadata related to the transaction of the new write operation and the journal data related to the transaction of the new write operation have been completely written to the respective reserved journal metadata portion and reserved journal data portion of the non-volatile journal storage are the new data chunks and the parity chunks related to the new write operation stored on the affected stripes of the main data storage spaces of the participating RAID storage devices.

However, if the writes associated with the transaction to the non-volatile journal storage do not complete due to a system crash/power failure, then the journal transaction is not able to complete and the corresponding write operation would be discarded due to the incomplete/invalid journal transaction. Since the main data storage is not updated in the event of an interrupted journal transaction, the stripes on the RAID storage devices are still consistent. Furthermore, when the RAID system is restarted subsequent to the crash or power failure, the write operation associated with an incomplete (e.g., invalid) journal transaction will be ignored (i.e., not replayed at the main data storage).

As described in the example of process 600, the new data chunks and the parity chunks related to the new write operation are written twice to the RAID storage devices: once to the reserved journal data space of at least two of the storage devices and a second time to the main data storage space of the participating storage devices.

At 612, the set of data chunks and the set of parity chunks are written to respective main data storage spaces of the participating storage devices.

At 614, whether writes associated with the set of data chunks and the set of parity chunks are written to respective main data storage spaces of the participating storage devices have completed are determined. In the event that the writes associated with the set of data chunks and the set of parity chunks to respective main data storage spaces have completed, control is transferred to 616. Otherwise, in the event that the writes associated with the set of data chunks and the set of parity chunks to respective main data storage spaces have not completed (e.g., due to an interruption caused by a system crash/power failure), process 600 ends. Only after the new data chunks and the parity chunks related to the new write operation have been successfully/completely written to the main data storage spaces is the journal record of the transaction associated with the new write operation invalidated in the non-volatile journal storage.

However, even if the writes associated with the set of data chunks and the set of parity chunks to the main data storage spaces of the RAID storage devices do not complete due to a system crash/power failure, the corresponding journal transaction, which has been completed, will be replayed after the RAID system is restarted (but prior to the system servicing normal read and write operations) to ensure that the data/parity chunks of the write operation are completely written to the main data storage.

At 616, the sets of metadata associated with the transaction are invalidated in the respective journal metadata spaces of the selected subset of the plurality of storage devices. In some embodiments, the journal metadata of the transaction associated with the new write operation can be invalidated by writing zeros over at least one field in each copy of the journal metadata associated with the new write operation. Since the minimal write unit on SSDs is a single LBA (e.g., 4096 bytes), and each metadata entry size is typically less than the size of a single LBA, one write command can be issued to write all zeroes to each location on the reserved journal metadata at which a copy of the journal metadata has been written. This effectively erases each copy of the journal metadata entry (including the checksums thereof) so that the corresponding journal transaction/record cannot be validated during a journal replay process. The invalidation of the journal record denotes that the corresponding write operation had been completed on the main data storage of the RAID group and therefore, does not need to be replayed or performed again after the system restarts following an unclean shutdown. As will be described in further detail below, following a RAID system suffering a crash, power loss, or another type of unclean shutdown, upon a restart, the RAID controller will scan the non-volatile journal stage of the storage devices to detect for any valid journal records. Each such valid journal record denotes a write operation that was not completed on the main data storage likely due to the unclean system shutdown. Then, the RAID controller will use the valid journal metadata and journal data of the record to "replay" the write operation (i.e., (re) write the journaled data chunks and parity chunks to their respective stripes/participating storage devices according to the journaled metadata).

At 618, a write complete message is returned. After the journal record has been invalidated, a message acknowledging the completion of the new write operation is returned to the requestor (e.g., host or application) that had sent the new write operation.

At 620, whether distributed journaling for write operations is to be continued to be performed is determined. In the event that distributed journaling for write operations is to be continued to be performed, control is returned to 602 to handle the next new write operation that is received at the RAID system. Otherwise, in the event that distributed journaling for write operations is not to be continued to be performed, process 600 ends.

As process 600 suggests, so long as the journal metadata and the journal data of the new write operation have been successfully written to the non-volatile journal storage on the RAID group, even if the corresponding write operation fails to complete before a system crash, that write operation can be replayed upon a system restart based on the journal metadata and the journal data. However, if the system crashes during the writing of the journal metadata and the journal data to the non-volatile journal storage, then the corresponding write operation will not be able to be replayed upon a system crash because there is no complete/valid journal record.

Process 600 is implemented to guarantee that the state of the new data writing process (during a normal input/output path) can be recovered upon a whole system interruption. In the event of system-crash/power-loss, the RAID group stops servicing of read and write operations. In order to bring the RAID group online, the state of the RAID group would be revalidated by replaying any valid transactions/records that are detected in the reserved non-volatile storage medium of the RAID group, such as will be described in the example process of FIG. 9, below. Thanks to the implementation of performing write operations prior to the whole system interruption as described in process 600, replaying the journal after a system restart (e.g., using a process such as process 900 of FIG. 9) is possible to close any possible write holes (i.e., appearance of inconsistent data) that were caused by the interruptions to inflight write operations.

FIG. 7 is a flow diagram showing an example process for selecting storage devices in a RAID group on which to store journal metadata corresponding to a new write operation in accordance with some embodiments. In some embodiments, process 700 may be implemented at a system such as system 300 of FIG. 3. Specifically, process 700 may be implemented at RAID controller 302 of FIG. 3. In some embodiments, step 608 of process 600 of FIG. 6 may be implemented, at least in part, using process 700.

At 702, a first storage device of a RAID group to which a parity chunk associated with a new write operation is to be written is determined. In some embodiments, the storage device of the first stripe of the main data storage to which a parity chunk that is computed based at least in part on the new data chunks associated with the new write operation is to be stored is determined. For example, the new data of the new write operation is segmented into data chunks and which stripe(s) of the main data storage to which the data chunks are to be written are determined using at least the configured RAID level/mode of the system. Then, as many parity chunks as required by the RAID level/mode in each of the affected stripes are computed based on the data chunks that will be stored and/or currently stored in that stripe. The RAID storage device on which a computed party chunk is to be stored in the first affected stripe is determined as the first selected storage device for which one instance of the journal metadata related to the transaction associated with the new write operation is to be written (in the selected storage device's corresponding reserved journal metadata space).

At 704, one or more other storage devices adjacent to the first storage device in the RAID group are selected. At least one other storage device in the RAID group that is adjacent to the first selected storage device is selected. The at least one other storage device may be "adjacent" to the first selected storage device by being adjacent in an order among which the RAID storage devices are written to in the writing of data and/or parity chunks associated with a new write operation, for example.

At 706, journal metadata associated with the new write operation is redundantly written to each of the first storage device and the selected one or more storage devices adjacent to the first storage device. An identical instance of the journal metadata related to the transaction associated with the new write operation is then written to each of the first selected storage device and each of the selected adjacent storage devices. As a result, identical copies of the journal metadata related to the transaction associated with the new write operation are written to each of at least two storage devices of the RAID group.

How many storage devices are adjacent to the first selected storage device to also select may be determined based on the RAID level/mode that is implemented. In some embodiments, the total number of selected storage devices on which to store the journal metadata related to a transaction associated with a new write operation is one more than the number of parity chunks that are used in a stripe for the configured RAID level/mode. For example, if RAID 5 were implemented at the RAID system, which uses one parity chunk and has a fault tolerance of one storage device, then one storage device adjacent to the first selected storage device can be selected to ensure that there is at least one remaining copy of the journal metadata that can be accessed to replay the write operation subsequent to a system crash, even if one storage device becomes unavailable. In another example, if RAID 6 were implemented at the RAID system, which uses two parity chunks and has a fault tolerance of two storage devices, then two storage devices adjacent to the first selected storage device can be selected to ensure that there is at least one remaining copy of the journal metadata that can be accessed to replay the write operation subsequent to a system crash, even if two storage devices become unavailable.

Process 700 merely describes one example process for selecting at least two storage devices in a RAID group on which to store instances of journal metadata related to the transaction associated with a new write operation and any other appropriate selection technique may be used so long as the selected storage devices alternate among the RAID group to ensure that the write burden is not disproportionally incurred at a subset of the storage devices.

Figure 8:
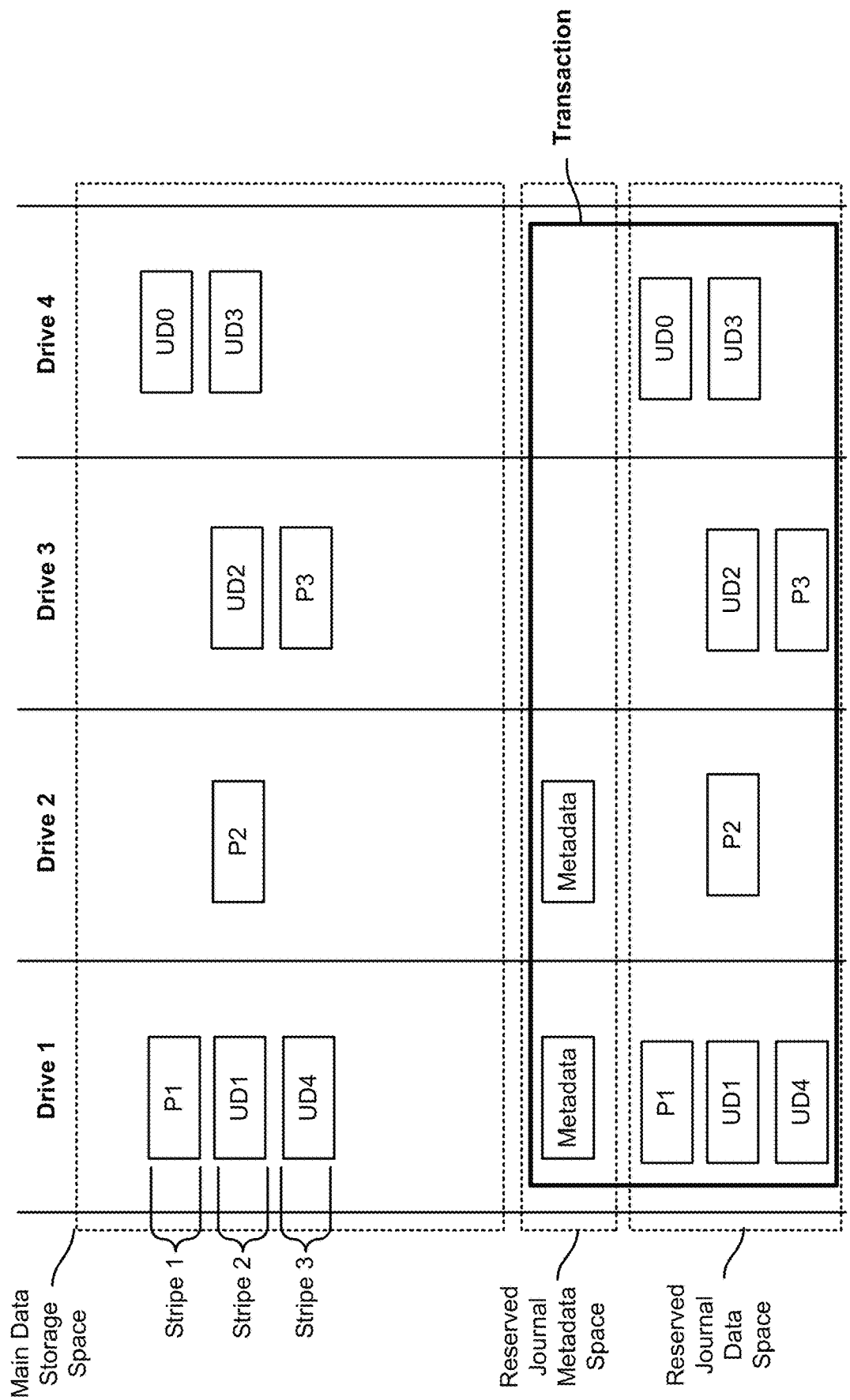
FIG. 8 is a diagram describing an example of performing distributed journaling of a new write operation to a RAID system in accordance with some embodiments.

FIG. 8 is a diagram describing an example of performing distributed journaling of a new write operation to a RAID system in accordance with some embodiments. In the example described in FIG. 8, four SSDs (Drives 1, 2, 3, and 4) combine to implement a RAID 5 system. Given that RAID 5 with four SSDs is used, for each stripe, there are three data chunks and one parity chunk (e.g., for each stripe, three storage devices will store data chunks and the fourth storage device will store a parity chunk that is computed as a function of the three data chunks in that stripe). The storage device on which the parity chunk is stored for each stripe rotates. In the example of FIG. 8, a new write operation comprising new user data for 5 LBAs at location X is received. The new user data is represented as the following five data chunks: UD0, UD1, UD2, UD3, and UD4. Given that the five data chunks are requested to be written at location X, which maps to Stripe 1 on the main data storage space portion of Drive 4, the first data chunk, UD0, will be written to Stripe 1 of Drive 4. Given that the strip located at Stripe 1 at Drive 4 will be updated to UD0, the parity chunk stored on the strip on Drive 1 of the same stripe, Stripe 1, will need to be updated to P1 because it is a function of the other three data chunks in Stripe 1. Put another way, new parity chunk P1 is computed as a function of the existing data chunks in Stripe 1 on Drives 2 and 3 (not shown) as well as new data chunk UD0 to be stored in Stripe 1 on Drive 4. Also, given the RAID 5 configuration, new data chunks UD1, UD2, and UD3 are to be stored in Stripe 2 respectively on Drives D1, D3, and D4. Given that new data chunks are to be written to Stripe 2 respectively on Drives D1, D3, and D4, the parity chunk in Stripe 2 on Drive D2 is to be updated to new parity chunk P2, which is a function of new data chunks UD1, UD2, and UD3 of the same stripe. Finally, new data chunk UD4 is to be stored in Stripe 3 on Drive 1. Given that the strip located at Stripe 3 at Drive 1 will be updated to UD4, the parity chunk stored on Drive 3 of the same stripe, Stripe 3, will need to be updated to P3 because it is a function of the other three data chunks in Stripe 3. Put another way, new parity chunk P3 is computed as a function of the existing data chunks in Stripe 3 on Drives 2 and 4 (not shown) as well as new data chunk UD4, which will be written to Stripe 3 of Drive 1.

Prior to writing new parity chunk P1 to Stripe 1 on Drive 1, new data chunk UD0 to Stripe 1 on Drive 4, new data chunk UD1 to Stripe 2 on Drive 1, new parity chunk P2 to Stripe 2 on Drive 2, new data chunk UD2 to Stripe 2 on Drive 3, new data chunk UD3 to Stripe 2 on Drive 4, new data chunk UD4 to Stripe 3 on Drive 1, and new parity chunk P3 is written to Stripe 3 on Drive 3 in each drive's respective main data storage space, journal metadata and journal data related to this new write operation must first be respectively stored in the reserved journal metadata space and the reserved journal data space to record the write operation as a single transaction. In the example of FIG. 8, creating the journal record corresponding to this transaction comprises writing the journal data comprising new data chunks UD0, UD1, UD2, UD3, and UD4 and the new parity chunks P1, P2, and P3 to the reserved journal data space on the same storage devices of the RAID group to which the data and parity chunks will eventually be written again in the main data storage space. As such, during this journaling phase, the chunks P1, UD1, and UD4 are written to the reserved journal data space of Drive 1 because these three chunks will be eventually written to the main data storage space of Drive 1. Furthermore, new parity chunk P2 is written to the reserved journal data space of Drive 2 because this one chunk will be eventually written to the main data storage space of Drive 2. Chunks UD2 and P3 are written to the reserved journal data space of Drive 3 because these two chunks will be eventually written to the main data storage space of Drive 3. Lastly, data chunks UD0 and UD3 are written to the reserved journal data space of Drive 4 because these two chunks will be eventually written to the main data storage space of Drive 4. Also, during this journaling phase, a respective copy of a set of metadata associated with the transaction is stored at each of selected drives, Drives 1 and 2. For example, a copy of the set of metadata describes on which stripes and drives the new data chunks UD0, UD1, UD2, UD3, and UD4 and the new parity chunks P1, P2, and P3 should eventually be written to in the main data storage and also includes the checksums of the UD0, UD1, UD2, UD3, UD4, P1, P2, and P3 data/parity chunks and the metadata itself. Each copy of the set of metadata that is stored on the reserved journal metadata space of each of Drives 1 and 2 is identical to each other to ensure fault tolerance. Drives 1 and 2 are selected as the subset of drives on which to store copies of the sets of metadata associated with the transaction using a process such as process 700 of FIG. 7. According to process 700 of FIG. 7, Drive 1 is first selected to store an instance of the set of metadata because it is the storage device on which the first stripe (Stripe 1) to which a new parity chunk (P1) associated with the new write operation is to be written. Then, Drive 2, which is adjacent to Drive 1, was also selected to store another instance of the set of metadata, based on the selection technique described by process 700 of FIG. 7. As such, the collection of the sets of metadata stored in the reserved journal metadata space in Drives 1 and 2 as well as the new data chunks UD0, UD1, UD2, UD3, and UD4 and the new parity chunks P1, P2, and P3 stored in the reserved journal data space in Drives 1, 2, 3, and 4 form the journal record corresponding to the transaction associated with the new write operation.

After the journaling of the transaction is completed, the new data chunks UD0, UD1, UD2, UD3, and UD4 and the new parity chunks P1, P2, and P3 are written to the main data storage space of the respective participating drives. As described above, new parity chunk P1 is written to Stripe 1 on Drive 1, new data chunk UD0 is written to Stripe 1 on Drive 4, new data chunk UD1 is written to Stripe 2 on Drive 1, new parity chunk P2 is written to Stripe 2 on Drive 2, new data chunk UD2 is written to Stripe 2 on Drive 3, new data chunk UD3 is written to Stripe 2 on Drive 4, new data chunk UD4 is written to Stripe 3 on Drive 1, and new parity chunk P3 is written to Stripe 3 on Drive 3. Given that the new data chunks UD0, UD1, UD2, UD3, and UD4 and the new parity chunks P1, P2, and P3 were already written once to the participating drives during the journaling phase to the respective journal data space, in various embodiments, writing the new data chunks UD0, UD1, UD2, UD3, and UD4 and the new parity chunks P1, P2, and P3 to the main data storage space is the second time that this same data is written to the participating drives of the RAID group. After the new data chunks UD0, UD1, UD2, UD3, and UD4 and the new parity chunks P1, P2, and P3 have been successfully written to the main data storage space of Drives 1, 2, 3, and 4, the corresponding journal record of the transaction is invalidated. In one example, the corresponding journal record of the transaction is invalidated by overwriting at least one field (e.g., the data checksum and/or the metadata checksum) of each copy of the set of metadata of the record with a predetermined value (e.g., a series of zeroes). In the example of FIG. 8, each copy of the set of metadata stored in the reserved journal metadata space of Drive 1 and Drive 2 is invalidated. By overwriting each at least a portion of each copy of the set of metadata of the record with a predetermined value (e.g., a series of zeroes), the overwritten value will no longer be determined as a set of valid journal metadata and therefore, not replayed in the event that the record is scanned following an unclean shutdown of the system (as will be described in process 900 of FIG. 9, below).

Writing redundant instances of a journal record's metadata across at least two drives beneficially protects against P drive failure, where P represents the number of parities used in a particular RAID level/mode. Specifically, by selecting a P+1 number of drives (a number that is one more than the P number of parity chunks in a stripe of the given RAID level/mode) on which to store a journal record's valid metadata, even if one drive becomes unavailable in a RAID 5 configuration or two storage devices become unavailable in a RAID 6 configuration, there will still be sufficient journaled data to enable a replay of a valid journal record/transaction subsequent to a system restart following an unclean system shutdown. Returning to the example of FIG. 8 in which RAID 5 is implemented, assume that there is first a system restart following an unclean system shutdown and then, during the replay of the valid journal transactions, Drive 1 fails. Due to the redundant copy of the valid set of metadata associated with the transaction that is still available on Drive 2, which has not failed, the successfully journaled data stored at the reserved journal data space comprising new data chunk UD0 on Drive 4, new parity chunk P2 on Drive 2, new data chunk UD2 on Drive 3, new data chunk UD3 on Drive 4, and new parity chunk P3 on Drive 3 are (re) written to their respective locations on the same drive in the main data storage spaces. After this transaction is replayed, any write hole in the main data storage space of the RAID group is closed and so the data on the remaining drives, Drives 2, 3, and 4, is consistent, which means that the remaining three drives can continue to operate in a normal partial drive fail condition. That is, due to the journal replay that has enabled the journaled data to be (re) written to the main data storage space of available Drives 2, 3, and 4 (new data chunk UD0 in Stripe 1 on Drive 4, new parity chunk P2 in Stripe 2 on Drive 2, new data chunk UD2 in Stripe 2 on Drive 3, new data chunk UD3 in Stripe 2 on Drive 4, and new parity chunk P3 in Stripe 3 on Drive 3), while Drive 1 remains offline, any read operations for data chunks that were stored at Drive 1 can be serviced by reconstructing the missing data chunks using the consistent data and parity chunks that can still be read from the available drives. For example, if data chunk UD1 stored at Stripe 2 on Drive 1 is requested after the journal replay and while Drive 1 is offline, the UD1 can be reconstructed using the parity chunk P2 stored on the main data storage space of Drive 2, data chunk UD2 stored on the main data storage space of Drive 3, and data chunk UD3 stored on the main data storage space of Drive 4.

As shown in FIG. 8, the writes associated with journaling a transaction that represents a new write operation to the RAID group are distributed across multiple drives of the group. As such, write bandwidth loading is almost the same distribution as if the journal were not implemented on the RAID group. Advantageously, distributing the writes associated with journaling the transaction also evenly distributes the write burden across the drives of the RAID group, which may be write-cycle limited SSDs.

While not shown in FIG. 8, in some other embodiments, the reserved journal metadata space is not allocated from the non-volatile (e.g., NAND flash) regions of the drives in the RAID group. Instead, the reserved journal metadata space, which does not require a large amount of storage space, can be implemented on a PMR (persistent memory region) of each drive. Even though the PMR includes a volatile media (e.g., DRAM), which enables low write latency, and unlimited write endurance, the journal metadata written to the volatile media of the PMR will be made persistent (e.g., copied to the non-volatile portion of the drive) in the event of an unclean system shutdown in part due to a backup-power-source (such as, for example, a super-capacitor) that will power such copying. Put another way, if the system does not experience an unclean system shutdown, then the journal metadata written to the volatile media of the PMR will not need to be copied into the non-volatile portion of the drive. As such, using the PMR to store journal metadata can advantageously reduce unnecessary writes to the non-volatile portion of the drive.

Figure 9:
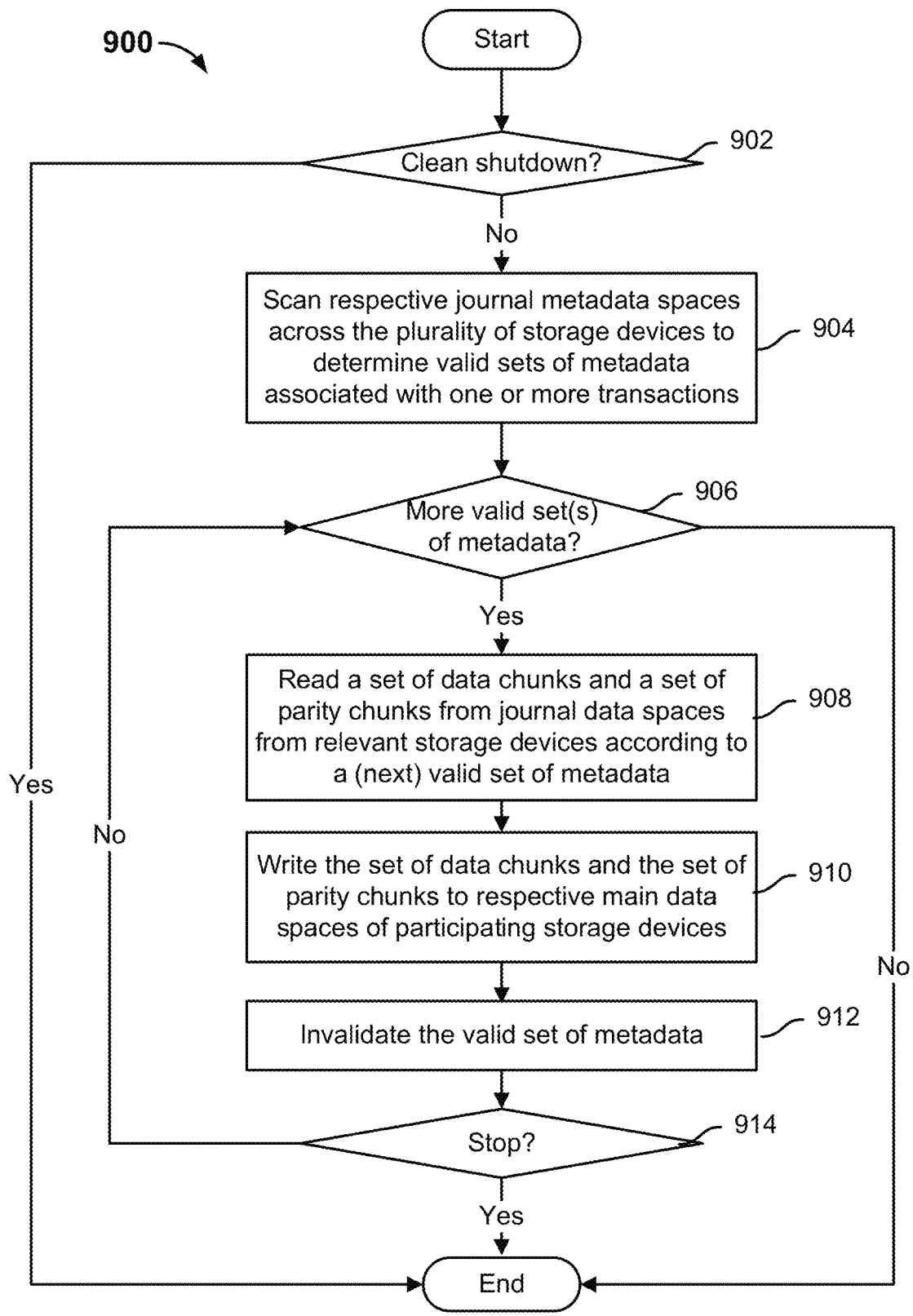
FIG. 9 is a flow diagram showing an example process for replaying a journaled transaction associated with a write operation in accordance with some embodiments.

FIG. 9 is a flow diagram showing an example process for replaying a journaled transaction associated with a write operation in accordance with some embodiments. In some embodiments, process 900 may be implemented at a system such as system 300 of FIG. 3. Specifically, process 900 may be implemented at RAID controller 302 of FIG. 3.

Process 900 describes an example process in which after a RAID system restarts following what is determined to have been an unclean system shutdown, valid journal records stored on the RAID storage devices are scanned for. Each detected, valid journal record represents a transaction that encompasses data of a write operation that had been successfully journaled but not completed at the main data storage of the RAID storage devices due to the system crash, power failure, or other cause of an unclean shutdown. Each such valid journal record is then replayed by (re) writing the journaled data of the transaction to the appropriate stripes/storage devices of the RAID group at their main data storage spaces.

In various embodiments, during a journal replaying process such as process 900 that occurs upon a system restart, the RAID group cannot service any read or write operations from users. The journal replaying process is an internal process that runs prior to the RAID group startup (e.g., handling of read and write operations).

At 902, whether a RAID group comprising a plurality of storage devices has experienced a clean shutdown is determined. Prior to this step, the previously shut down RAID system has been restarted. Upon restart, it is determined whether the RAID system had shut down cleanly/gracefully (e.g., intentionally and so certain processes such as inflight write operations were completed prior to shut down) or uncleanly (e.g., unintentionally due to a crash or power loss and so certain processes such as inflight write operations may not have had a chance to complete prior to shutdown).

The following is one example technique for determining whether the RAID system had shutdown uncleanly upon a system restart: After the RAID system starts up and prior to the servicing of any read or write operations, the RAID controller sets a flag that is marked dirty in a configuration file that is stored on a non-volatile medium of the RAID system. If the RAID system is able to shut down cleanly/gracefully, the dirty flag will be marked as clean prior to the shutdown. However, if the RAID system then does not shut down cleanly/gracefully, then the dirty flag will not be marked as clean prior to the shutdown. As a result, when the RAID system restarts after a shutdown, this flag in the configuration file stored on the non-volatile medium is checked. If the flag is dirty, then it is inferred that the system had uncleanly shutdown and that therefore, valid journal records should be looked for on the RAID storage devices.

In the event that the system is determined to have shut down cleanly/gracefully, then it is presumed that there are no write holes to close and so the journal does not need to be replayed and process 900 ends. Otherwise, in the event that the system is determined to not have shut down cleanly/gracefully, then it is presumed that a write hole is possible and so the journal does need to be replayed to close such write hole(s), as will be described below in steps 904 through 914.

At 904, respective journal metadata spaces across the plurality of storage devices are scanned to determine valid sets of metadata associated with one or more transactions. The reserved journal metadata space of each storage device in the RAID group is scanned for the sets of metadata. For each detected set of metadata in the reserved journal metadata space of a storage device, a metadata checksum is computed using the contents of the set of metadata. The computed metadata checksum is compared against the metadata checksum stored in the set of metadata to determine if the two checksums match. If the comparison return matches, then the set of metadata is valid. Otherwise, if the comparison does not return a match, then the set of metadata is invalid. As described above, an invalid set of metadata indicates that the corresponding write operation was successfully completed on the main data storage of the RAID storage devices prior to the unclean shutdown of the system. On the other hand, a valid set of metadata indicates that the corresponding write operation was not successfully completed on the main data storage of the RAID storage devices prior to the unclean shutdown of the system and should be replayed.

At 906, whether there is at least one more valid set of metadata to process is determined. In the event that there is at least one more valid set of metadata to process, control is transferred to 908. Otherwise, in the event that there are no more valid sets of metadata to process, process 900 ends.

At 908, a set of data chunks and a set of parity chunks are read from journal data spaces from relevant storage devices according to a (next) valid set of metadata. The set of data chunks and the set of parity chunk(s) that are included in the same transaction/record and are part of the same write operation associated with the valid set of metadata are read from the reserved journal data spaces of RAID storage devices. For example, the set of metadata describes where each data chunk or parity chunk is located within the reserved journal data space of which RAID storage device and so the data/parity chunks of the transaction can be read accordingly.

At 910, the set of data chunks and the set of parity chunks are written to respective main data spaces of participating storage devices. The data and parity chunks of the transaction that are read from the reserved journal data spaces are then written to the main data storage portion of the RAID storage devices in accordance with the valid set of metadata, which specifies the stripe in the main data storage space of a specified storage device at which each data/parity chunk should be stored.

At 912, the valid set of metadata is invalidated. After the data and parity chunks of the transaction are successfully written to the main data storage portion of the RAID storage devices in accordance with the valid set of metadata, then each of the one or more copies of the set of metadata in the reserved journal metadata place are invalidated. As described above, each of one or more copies of a set of metadata can be invalidated by overwriting at least one field within the metadata to a predetermined value such that the metadata will not be able to be validated. Invalidating the (copies of the) set of metadata of the transaction indicates that the data and parity chunks of a previously incomplete write operation (e.g., due to an unclean system shutdown) has now been successfully replayed/(re) written to the main storage space of the RAID storage devices.

At 914, whether valid set(s) of metadata are continued to be detected is determined. In the event that valid set(s) of metadata are continued to be detected, control is returned to 906. Otherwise, in the event that valid set(s) of metadata are no longer continued to be detected, process 900 ends.

Figure 10:
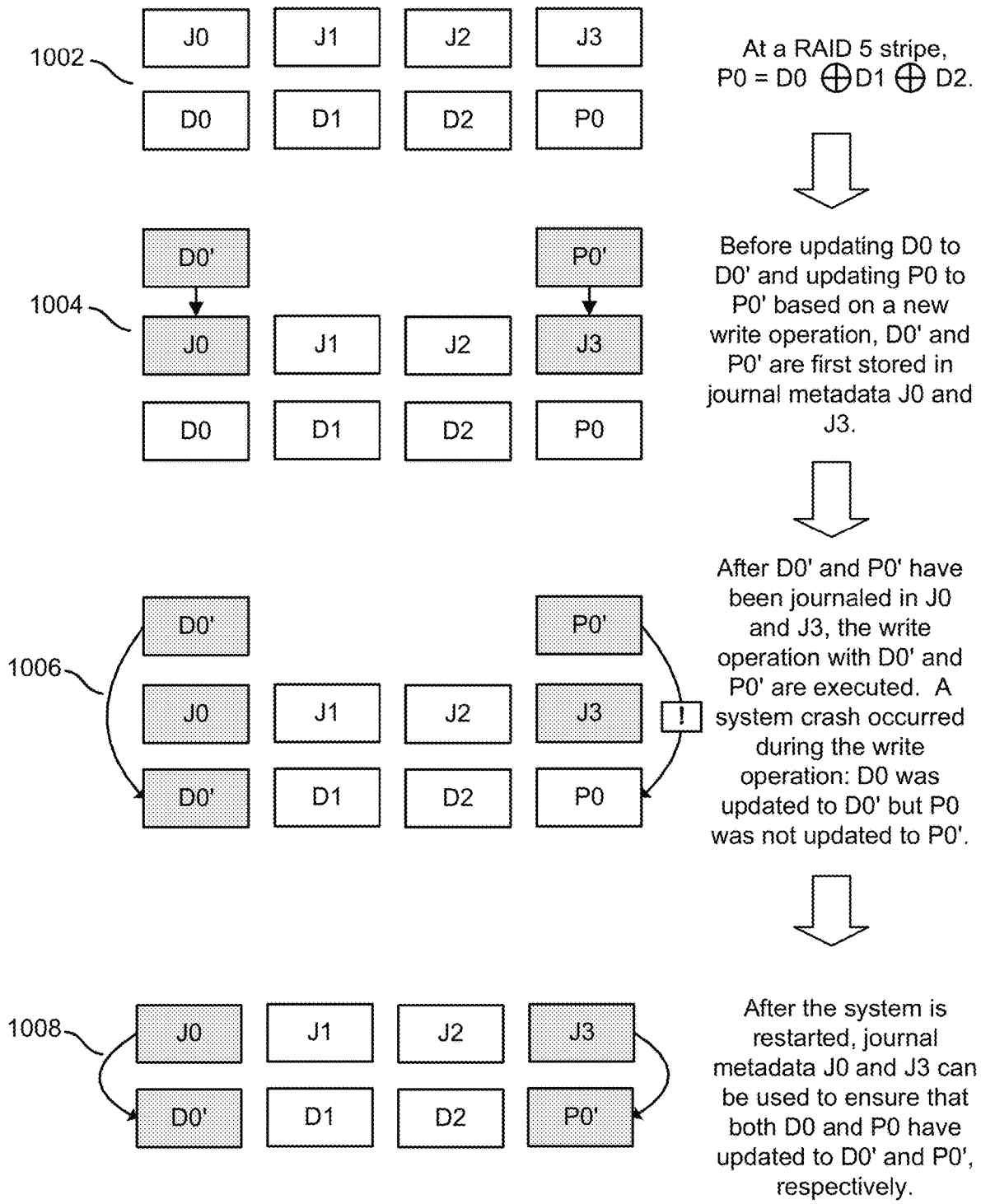
FIG. 10 describes an example of how a previously incomplete write operation can be replayed/rewritten to a RAID group following a system restart in accordance with some embodiments.

FIG. 10 describes an example of how a previously incomplete write operation can be replayed/rewritten to a RAID group following a system restart in accordance with some embodiments. The example of FIG. 10 comprises a RAID 5 system comprising four drives. In the example of FIG. 10, 1002 refers to the data and parity chunks (D0, D1, D2, and P0) that are currently stored across a given stripe across the four drives of the RAID 5 system, prior to a new write operation. Specifically, in the state as shown with 1002, the stripe currently stores data chunk D0 at a first drive, data chunk D1 at a second drive, data chunk D2 at a third drive, and parity chunk P0 at the fourth drive. Furthermore, in the state as shown with 1002, parity chunk P0 was computed as a function of D0⊕D1⊕D2. Label 1002 also shows that journal metadata (J0, J1, J2, and J3) corresponding to these D0, D1, D2, and P0 chunks have also been stored in the non-volatile journal storage of the RAID drives in accordance with various embodiments described herein. At 1004, a new write operation is received, which requires D0 to be updated to D0'. As a result of updating D0 to D0', the updated parity chunk that is computed as a result of D0'⊕D1⊕D2 should be P0'. But before D0' can be written to replace D0 in Drive 1 and P0' can be written to replace P0 in Drive 4, journaling of the new data/party chunks must first be performed. In this journaling phase, first, redundant copies J0 and J3 of new journal metadata that each describes that D0' should be written to the given stripe of Drive 1 and that P0' should be written to the given stripe of Drive 4 is written to the reserved journal metadata spaces of P+1 drives, which are Drive 1 and Drive 4 in this RAID 5 example. Secondly, the underlying data of D0' is written to the reserved journal data space of Drive 1 and P0' is written to the reserved journal data space of Drive 4. One reason to journal the data and parity chunks related to a write operation in the same drives on which they will be written to the main data storage is to be able to benefit from COPY/Vendor-specific-MOVE instructions to reduce write amplification on SSDs, which will be described further below. At 1006, after the journaling phase is complete, the write operation comprising writing D0' to replace D0 in the main storage space of Drive 1 and writing P0' to replace P0 in the main storage space of Drive 4 is performed. However, after D0' was written to replace D0 in the main storage space of Drive 1 but before P0' was successfully written to replace P0 in the main storage space of Drive 4, the RAID system crashes. As a result, a write hole is created to cause the given stripe of the RAID 5 system to be inconsistent. Nevertheless, after the system restarts and it is determined that an unclean shutdown had occurred, at least one copy of the journal metadata J0 and J3 is detected in the reserved journal metadata spaces of the RAID drives. Once the journal metadata J0 and/or J3 are confirmed to be valid, then at 1008, the journal metadata J0 and/or J3 are used along with the underlying data of D0' and P0' that were written to the reserved journal data spaces of the RAID drives to rewrite D0' in the main storage space of Drive 1 and write P0' to replace P0 in the main storage space of Drive 4. Note that in this specific example, while D0' had already been successfully written to the given stripe at Drive 1, the replay of the transaction comprising journal metadata J0 and J3 performs writes of each data and parity chunk of the transaction and so upon the system restart, D0' was again written in the main storage space of Drive 1 and write P0' was written for the first time to replace P0 in the main storage space of Drive 4. As a result of replaying the transaction associated with valid journal metadata J0 and/or J3, the stripe becomes consistent again because it includes D0', D1, D2, and P0' across Drives 1, 2, 3, and 4 and because P0'=D0'⊕D1⊕D2. A consequence of the stripe having consistent data is that should any one of Drives 1, 2, 3, or 4 fails and data is requested from the stripe, the data and/or parity chunks of the stripe that are stored in the three available drives can be used to successfully recover a missing data chunk.

In various embodiments described above, the new data chunks of a new write operation and related parity chunks are written twice to the storage devices of a RAID group: the first time, the data and parity chunks are written in the journaling phase to the reserved journal data space and the second time (after the completion of the journaling phase), the data and parity chunks are written to the main data storage. While writing the new data chunks of a new write operation and related parity chunks twice to the storage devices of the RAID group provides a reliable form of distributed journaling, the technique does require a heavier write burden to the write cycle limited SSDs.

Below are two other embodiments of distributed journaling in which the new data chunks of a new write operation and related parity chunks are only written once to the storage devices of a RAID group:

In a first other embodiment, the new data chunks of a new write operation and related parity chunks are written only once to the storage devices of a RAID group and involve using a "COPY" Non-Volatile Memory Express (NVMe) command. In this embodiment, the flash translation layer (FTL) of each SSD storage device in the RAID group is modified such that after the journaling phase is complete and the journal metadata is written to the reserved journal metadata space of storage devices of the RAID group and the journal data (including the data chunks of a new write operation and related parity chunks) is written to the reserved journal data space of storage devices of the RAID group, a received "COPY" NVMe command will cause the FTL of each SSD to update the device's corresponding logical-to-physical mapping table without performing any additional read or writes to the device's NAND flash (where the journal data has been written). The logical-to-physical mapping table stores the mapping of the logical address of a data chunk to the physical address on the NAND flash at which the data chunk is actually stored. Instead of reading the journal data out of the reserved journal data space out of the SSD, the FTL will update the logical-to-physical mapping table of the corresponding storage device to associate the logical address(es) within the main data storage to the physical address(es)/locations at which the data/parity chunk(s) were previously written in its reserved journal data space. Put another way, in response to an NVMe "COPY" command to copy the journal data in the drive's reserved journal data space to the drive's main data storage, the drive's FTL will simply copy the physical addresses of the journal data to map to the logical address(es) (to which the journal data is to be stored in the drive's main data storage) in the logical-to-physical mapping table.

In a second other embodiment of distributed journaling, the new data chunks of a new write operation and related parity chunks are written only once to the storage devices of a RAID group and involve using an SSD drive vendor specific "MOVE" command. In this embodiment, the SSD drive is especially configured such that after the journaling phase is complete and the journal metadata is written to the reserved journal metadata space of storage devices of the RAID group and the journal data (including the data chunks of a new write operation and related parity chunks) is written to the reserved journal data space of storage devices of the RAID group, a received vendor specific "MOVE" command will cause the SSD to update the device's corresponding logical-to-physical mapping table without performing any additional read or writes to the device's NAND flash (where the journal data has been written). Instead of reading the journal data out of the reserved journal data space out of the SSD, the SSD will update its own logical-to-physical mapping table to associate the logical address(es) within the main data storage to the physical address(es)/locations at which the data/parity chunk(s) were previously written in its reserved journal data space. Put another way, in response to a vendor specific "MOVE" command to move the journal data in the drive's reserved journal data space to the drive's main data storage, the specifically configured drive will transfer the owner of physical NAND storage space from its reserved journal data space to corresponding its desired main data storage space. After successfully moving the physical addresses owner, in response to future reading(s) from the same location on the reserved journal data space before writing any new journal data to the same location, the SSD should return READ-Error. This implementation should be relatively less complex compared to using COPY command in some FTL implementation, if the FTL does not have the feature of sharing single physical address to multiple address, which requires reference counting and more complex garbage collection algorithm.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
   a main data storage on a plurality of storage devices associated with a redundant array of independent disks (RAID) group;
   a non-volatile journal storage associated with the main data storage also stored on the plurality of storage devices, wherein the non-volatile journal storage comprises a journal data storage portion and a journal metadata storage portion, wherein the journal data storage portion comprises respective journal data spaces across the plurality of storage devices and the journal metadata storage portion comprises respective journal metadata spaces across the plurality of storage devices;
   a RAID controller configured to:
      write a record of a new write operation to the non-volatile journal storage including to:
         compute a set of parity chunks and a set of data chunks associated with new data associated with the new write operation based at least in part on a RAID level associated with the RAID group;
         write the set of parity chunks and the set of data chunks to the respective journal data spaces of a first at least subset of the plurality of storage devices; and
         write redundant sets of metadata associated with the new write operation to the respective journal metadata spaces of a second at least subset of the plurality of storage devices;
      after the record of the new write operation is written to the non-volatile journal storage, write the set of parity chunks and the set of data chunks to the main data storage; and
      after the new data associated with the new write operation is written to the main data storage, invalidate the record of the new write operation in the non-volatile journal storage; and
      wherein upon restarting the plurality of storage devices associated with the RAID group, the non-volatile journal storage is checked and one or more write operations associated with valid records in the non-volatile journal storage are performed on the main data storage.

2. The storage system of claim 1, wherein the plurality of storage devices comprises a plurality of solid-state drives (SSDs).

3. The storage system of claim 1, wherein the plurality of storage devices associated with the RAID group is configured to implement one of RAID 4, RAID 5, RAID 6, or a RAID type that uses three or more parity chunks in a stripe.

4. The storage system of claim 1, further comprising:
   wherein the RAID controller is further configured to:
      determine participating storage devices of the RAID group to which to write the set of data chunks and the set of parity chunks.

5. The storage system of claim 4, wherein each set of metadata associated with the new write operation comprises one or more of the following: identifiers of storage devices that are participating in the new write operation, where the set of data chunks and the set of parity chunks are to be stored in the main data storage, a metadata checksum, and a checksum of data chunks.

6. The storage system of claim 1, wherein the second at least subset of the plurality of storage devices comprises at least two selected storage devices.

7. The storage system of claim 1, wherein the RAID controller is further configured to invalidate the record in the non-volatile journal storage including to invalidate the redundant sets of metadata associated with the new write operation.

8. The storage system of claim 7, wherein to invalidate the redundant sets of metadata associated with the new write operation comprises to rewrite at least one field included in the redundant sets of metadata.

9. The storage system of claim 1, wherein the RAID controller is further configured to:
   upon the restart of the plurality of storage devices, determine that the plurality of storage devices has experienced an unclean shutdown; and
   in response to the determination that the plurality of storage devices has experienced the unclean shutdown, scan the non-volatile journal storage for the valid records associated with the one or more write operations.

10. The storage system of claim 9, wherein to determine that the plurality of storage devices has experienced the unclean shutdown comprises to check a flag stored in a configuration file.

11. The storage system of claim 9, wherein the RAID controller is further configured to:
   read, from the non-volatile journal storage, a set of journaled data and parity chunks associated with a valid record; and
   write the set of journaled data and parity chunks to the main data storage in accordance with the set of journaled metadata associated with the valid record.

12. The storage system of claim 1, wherein the respective journal metadata spaces comprise persistent memory regions (PMRs).

13. A method, comprising:
   receiving a new write operation to a plurality of storage devices associated with a redundant array of independent disks (RAID) group, wherein the plurality of storage devices comprises a main data storage and a non-volatile journal storage, wherein the non-volatile journal storage comprises a journal data storage portion and a journal metadata storage portion, wherein the journal data storage portion comprises respective journal data spaces across the plurality of storage devices and the journal metadata storage portion comprises respective journal metadata spaces across the plurality of storage devices;
   writing a record of the new write operation to the non-volatile journal storage, including:
      computing a set of parity chunks and a set of data chunks associated with new data associated with the new write operation based at least in part on a RAID level associated with the RAID group;
      writing the set of parity chunks and the set of data chunks to the respective journal data spaces of a first at least subset of the plurality of storage devices; and
      writing redundant sets of metadata associated with the new write operation to the respective journal metadata spaces of a second at least subset of the plurality of storage devices;
   after the record of the new write operation is written to the non-volatile journal storage, writing the set of parity chunks and the set of data chunks to the main data storage; and
   after the new data associated with the new write operation is written to the main data storage, invalidating the record of the new write operation in the non-volatile journal storage, wherein upon restarting the plurality of storage devices associated with the RAID group, the non-volatile journal storage is checked and valid records of one or more write operations included in the non-volatile journal storage are written to the main data storage.

14. The method of claim 13, wherein the plurality of storage devices comprises a plurality of solid-state drives (SSDs).

15. The method of claim 13, wherein the plurality of storage devices associated with the RAID group is configured to implement one of RAID 4, RAID 5, RAID 6, or a RAID type that uses three or more parity chunks in a stripe.

16. A storage system, comprising:
- a main data storage on a plurality of storage devices associated with a redundant array of independent disks (RAID) group;
- a non-volatile journal storage associated with the main data storage also stored on the plurality of storage devices, wherein:
  - a record of a new write operation is written to the non-volatile journal storage;
  - after the record of the new write operation is written to the non-volatile journal storage, new data associated with the new write operation is written to the main data storage, wherein the new data associated with the new write operation that is written to the main data storage comprises a logical-to-physical mapping table being updated without writes being performed at the main data storage; and
  - after the new data associated with the new write operation is written to the main data storage, the record of the new write operation is invalidated in the non-volatile journal storage; and
- wherein upon restarting the plurality of storage devices associated with the RAID group, the non-volatile journal storage is checked and one or more write operations associated with valid records in the non-volatile journal storage are performed on the main data storage.

* * * * *